United States Patent [19]

Shea

[11] 3,905,457

[45] Sept. 16, 1975

[54] TRANS-AXLE WITH INTEGRAL BRAKING

[75] Inventor: Dennis W. Shea, Toledo, Ohio

[73] Assignee: Dana Corporation, Toledo, Ohio

[22] Filed: May 24, 1974

[21] Appl. No.: 473,103

Related U.S. Application Data

[63] Continuation-in-part of Ser. No. 445,716, Feb. 25, 1974, which is a continuation-in-part of Ser. No. 384,815, Aug. 2, 1973, abandoned.

[52] U.S. Cl. .................. 192/5; 192/4 A; 74/710.5; 188/31
[51] Int. Cl.[2] .................. F16H 57/10; F16D 41/24
[58] Field of Search .............. 192/4 A, 5, 6 A, 6 B; 74/710.5

[56] References Cited
UNITED STATES PATENTS

| | | | |
|---|---|---|---|
| 1,903,199 | 3/1933 | Small | 192/4 A |
| 3,439,786 | 4/1969 | Schmid | 74/710.5 X |
| 3,517,572 | 6/1970 | Schmid | 74/710.5 |
| 3,766,805 | 10/1973 | Shea et al. | 192/6 A |

FOREIGN PATENTS OR APPLICATIONS

| | | | |
|---|---|---|---|
| 19,278 | 6/1902 | United Kingdom | 192/6 B |

*Primary Examiner*—Benjamin Wyche

[57] ABSTRACT

The invention is a trans-axle with integral braking for use in two wheel drive vehicles. The apparatus accepts rotary power through rotary input means and transfers it through transmission to a differential to two separate outputs, allowing the driving wheels to rotate at different speeds while the vehicle is cornering. A one-way clutch is employed to allow the two outputs to freewheel or coast in the forward direction, at the same or different speeds, without rotation of the rotary input means. Reversal of the rotary input means actuates a brake which slows or stops the differential case. This in turn slows or stops both outputs while still maintaining the differential action for vehicle cornering during deceleration. In addition, the apparatus includes an anti-back travel feature which automatically engages the brake when the vehicle travels backward and a parking brake feature by which the brake remains set at the braking level employed. The brake may always be released by the application of forward rotary input power or by actuation of a brake release pawl which allows the normally nonrotational brake mechanism to rotate with the differential input. This also allows the vehicle to be driven in reverse by application of input power with a "direction" opposite to the normal input.

8 Claims, 4 Drawing Figures

PATENTED SEP 16 1975 3,905,457

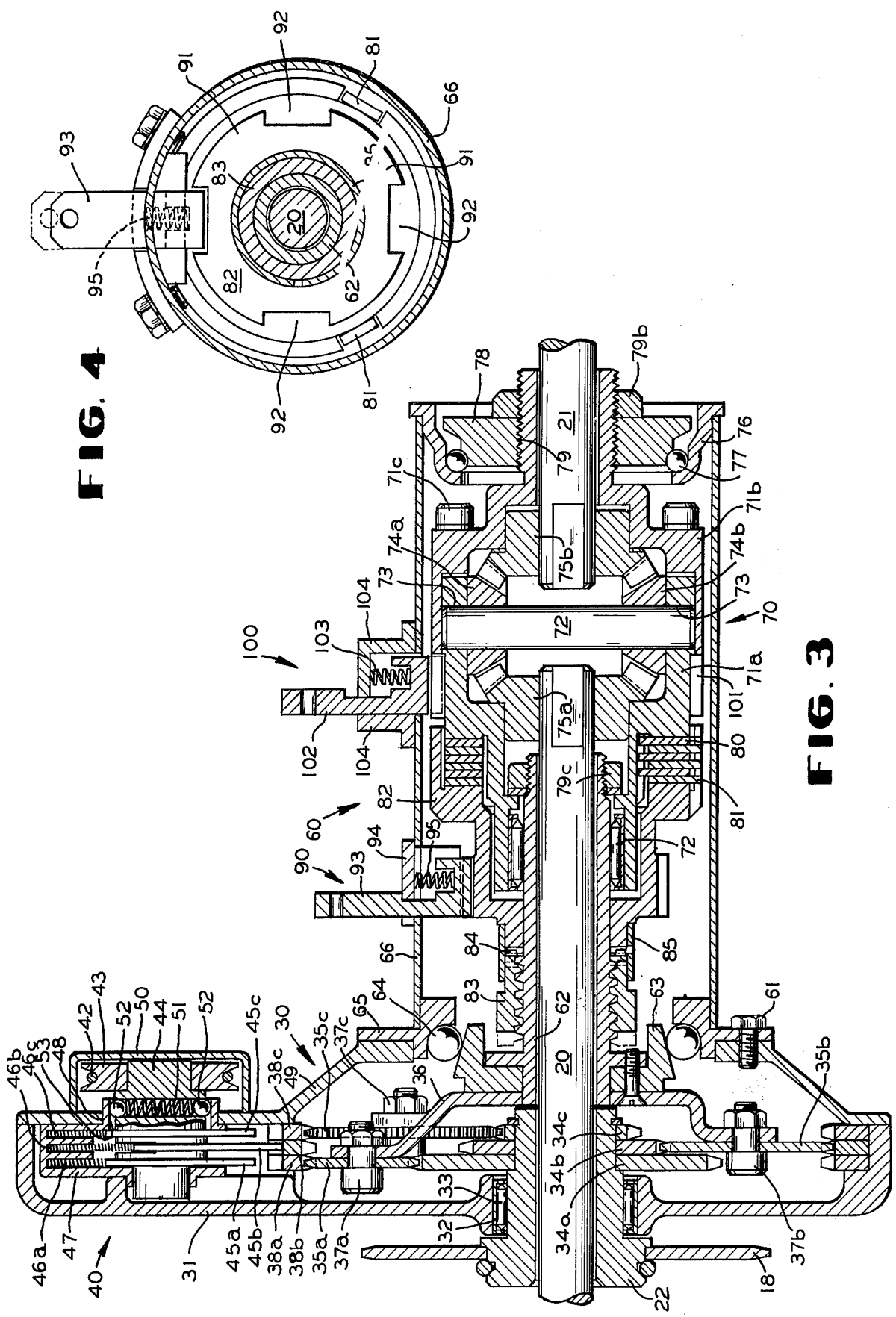

TRANS-AXLE WITH INTEGRAL BRAKING

CROSS REFERENCE TO RELATED APPLICATIONS

This is a continuation-in-part of U.S. Pat. Application Ser. No. 445,716 filed Feb. 25, 1974 which is a continuation-in-part of U.S. Pat. Application Ser. No. 384,815 filed Aug. 2, 1973 and now abandoned.

BACKGROUND OF THE INVENTION

The invention relates to a trans-axle with integral braking for use in two wheel drive vehicles, and more particularly for use in three wheeled velocipedes with rear wheel drive.

Three wheeled velocipedes or tricycles having two rear wheels have generally been driven through only one rear wheel. This eliminates the need for a differential between the rear wheels and facilitates the use of a standard coaster brake assembly for the driving wheel axle. However, the use of only one of two rear wheels for application of power and braking presents serious problems. Such a vehicle tends to turn in one direction during application of power, since power application is inherently uneven. If the only braking provided is the coaster brake on one wheel, the vehicle also tends to turn rather abruptly during braking. Thus, the vehicle has poor handling characteristics and may be somewhat dangerous.

Some tricycles have been equipped with a differential to provide two rear driving wheels. The vehicles, however, have employed other type braking systems, such as wheel rim gripping brakes. Two standard coaster brake assemblies could not be independently activated by a central driving sprocket since this sprocket would be delivering power to the differential. Other systems include a differential between the rear wheels, and an intermediate braking axle, which mounts a coaster brake. A pair of chains are utilized. One chain extends from the pedal sprocket to the intermediate axle and the other chain extends from the intermediate axle to the rear axle.

Further, systems for driving a velocipede or the like generally provide multi-speed capability, if at all, only with a separate speed changing device.

SUMMARY OF THE INVENTION

The present invention provides a novel, compact transmission differential and braking assembly for use in two wheel drive vehicles. The assembly comprises a transmission differential and coaster brake in one housing for even distribution of power and braking to the two rear wheels. In its application to a three-wheeled velocipede the invention eliminates problems of power application and braking inherent in similar prior art vehicles. The apparatus also includes several other braking features not found in such prior art vehicles as well as the ability to release the brake and drive the vehicle in reverse via the application of input power in the direction normally associated with braking.

Rotary power is transmitted to the assembly through rotary input means such as a sprocket. Through an input sleeve, transmission and a one-way clutch the power is transmitted to a differential case. The differential case transfers power through pinion and side gears to the two output shafts. Thus, a vehicle equipped with the device is given two wheel differentiated drive like a typical automobile, with the wheels powered at different speeds around corners.

For coasting the power input is stopped and, by virtue of the one-way clutch, both outputs can freewheel, or coast, in the forward direction. The two wheels may freewheel at the same speed or at different speeds if required to do so because of vehicle cornering.

For dynamic braking the rotary input is reversed. This reverses the rotation of a rotary input sleeve and the transmission. A lead screw on the output of the transmission urges a lead nut against a braking member to activate a brake. Through the brake, the rotary differential case is normally grounded to the device's stationary exterior housing. The output shafts of the device slow or stop as the differential case slows or stops, yet differential action is maintained for vehicle cornering during deceleration.

The apparatus of the invention includes an anti-back travel feature whereby the brake is automatically engaged on an upgrade if the vehicle begins to roll back due, for example, to driver fatigue. Backward motion causes the input sleeve with its lead screw to rotate backward, again urging the lead nut against braking members to activate the brake. The brake is set in direct proportion to the gravitational forces acting on the vehicle so that braking is proportional and more than equal to that required to hold the vehicle from rolling backward when placed on an upgrade with no input power. Thus, the operator need only discontinue input power on an upgrade and allow the vehicle to stop to activate this parking brake.

The brake also works as a downgrade vehicle parking brake. When the operator reverses the input with sufficient force to stop the vehicle, the brake remains set and holds the vehicle even though reverse input force is removed. To release the brake the operator need only apply forward input power and then continue in either the driving mode or the coasting mode.

As mentioned above, the brake device does not normally permit reverse operation of a vehicle. Nor does the brake device normally permit forward pushing of a vehicle when the brake has been set but not released. Since it is desirable to push a vehicle backward for parking or storage, to push it forward without having to apply forward rotary input power, and to allow reverse operation of the vehicle, a release mechanism may be provided for this purpose. The braking member is normally non-rotational, being grounded to the exterior housing. For provision of a release means, this non-rotational grounding of the braking member is accomplished through a spring loaded releasable pawl. When the pawl is released by the operator, the brake member is allowed to rotate along with the differential case and the vehicle can be moved freely forward or backward until the pawl is again allowed to engage. Also, while the pawl is disengaged the brake can act as a clutch and allow the vehicle to be operated in reverse through the brake.

BRIEF DESCRIPTION OF THE DRAWINGS

FIG. 3 is an enlarged vertical cross-sectional view, taken along the line 3—3 of FIG. 2, and showing the transmission, differential and braking assembly in its braking position and with the planet gears rotated from their actual position for clarity;

FIG. 4 is a vertical cross-sectional view taken along the line 4—4 of FIG. 2.

DESCRIPTION OF THE PREFERRED EMBODIMENT

Figure 1:
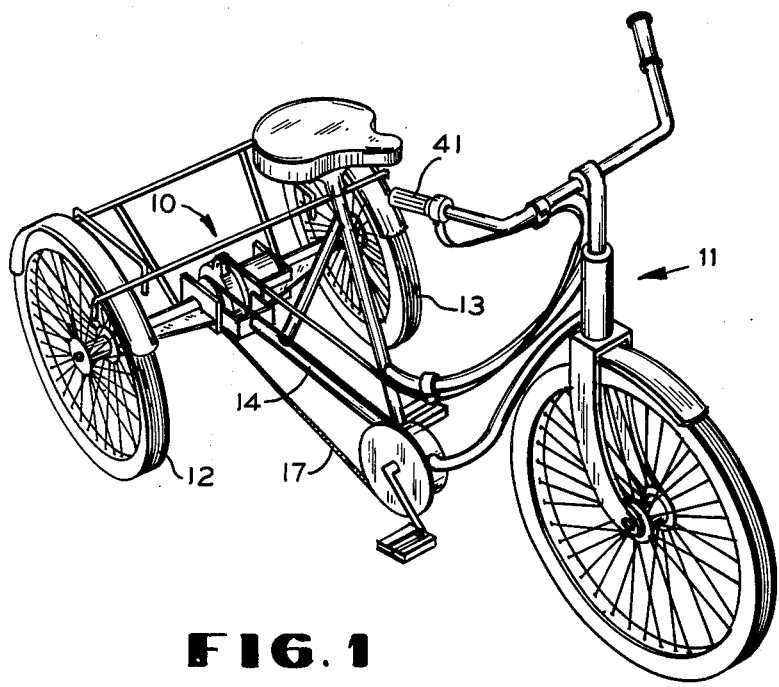
FIG. 1 is a perspective view of a tricycle incorporating the transmission, differential and braking assembly of the present invention.
Figure 2:
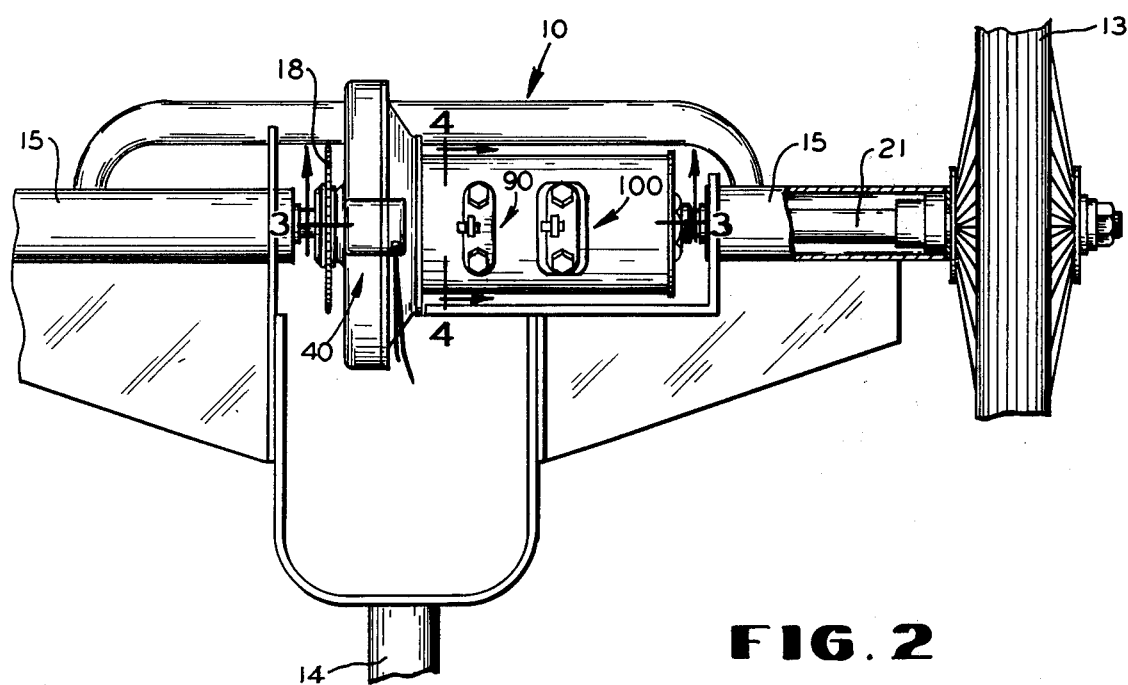
FIG. 2 is a fragmentary enlarged plan view of a preferred embodiment of the transmission, differential and braking assembly of the invention as employed in the tricycle shown in FIG. 1.

Referring to FIGS. 1 and 2, a transmission, differential and braking assembly, according to the present invention, is generally indicated by the reference numeral 10. In many types of velocipedes and in, for example, a tricycle 11, as shown in FIG. 1, the assembly 10 is positioned between rear wheels 12 and 13. The assembly 10 is mounted by the tricycle frame 14, which also mounts axle tubes 15. The tricycle 11 includes pedals 16 which drive a chain 17 to rotate, in one direction or the other, a drive sprocket 18. A pair of aligned and independent output shafts 20 and 21 extend through the axle tubes 15 and operatively mount the wheels 12 and 13, respectively. The drive sprocket 18 is fixed to a sleeve 22 which provides the input to the transmission 30, as shown in FIG. 3.

The transmission 30 can be, and preferably is, generally similar to that shown in U.S. Pat. No. 3,766,805. As best illustrated in FIG. 3 the transmission 30 is of the planetary type. The housing 31 includes a bore 32 in which the bearing race 33 is supported. The sleeve 22 is rotatably mounted on the bearings 33 and has drivingly mounted, opposite the sprocket 18, a plurality of sun gears 34 $a$, $b$, and $c$ which are concentric with and carried on output shaft 20. Drivingly associated with the sun gears 34 are a plurality of planet gears 35 rotatably mounted on a carrier 36. Preferably two diametrically mounted planet gears are provided for each sun gear.

As mentioned in the description of the drawings, the planet gears are shown angularly offset on the carrier from their actual positions for clarity. In practice the planet gear 35$a$ and its companion planet gear (not shown) are located diametrically opposite each other on a line through the axis of the transmission (i.e., axle 20). Planet gear 35$a$ and its companion are rotatably mounted on the carrier 36 by any suitable means such as bolt and nut assemblies 37$a$ and drivingly engaged both the sungear 34$a$ and the ring gear 38$a$.

A second pair of planet gears 35$b$ and its companion (not shown) are similarly mounted on carrier 36, about 120° away from gears 35$a$, by nut and bolt assemblies 37$b$ and drivingly engage both sun gear 34$b$ and ring gear 38$b$. Finally, planet gear 35$c$ and its companion (not shown) are mounted by nut and bolt assemblies 37$c$, to the carrier 36 about 120° from both gears 35$a$ and 35$b$ and drivingly engage both sun gear 34$c$ and ring gear 38$c$. Each of the planet gear sets 37$a$, 37$b$ and 37$c$ provides a different gear ratio between the input sleeve 22 and the carrier 36 which serves as the transmission output. In a typical application, the sun gears 34$a$, $b$, and $c$ will have 36, 24 and 16 teeth respectively, and provide transmission speed ratios of 0.367, 0.279, and 0.205 in the $a$, $b$ and $c$ gear trains respectively. Of course other ratios and more or fewer different ratios can be used depending on the application.

Selection among the various gear ratios is provided by the speed selector designated generally by the numeral 40. Referring to FIG. 1, a twist grip shift handle is used to provide operator control of the gear ratio to be used. The handle 41 is connected to the speed selector 40 by a control cable 42 (FIG. 3) and, as will more fully be described, controls which ring gear is held stationary thereby establishing the transmission gear ratio.

More specifically, the cable 42 wraps about and is pinned to pulley 43 which is fixedly mounted on camshaft 44. A plurality of pawls 45, corresponding in number to the number of speeds in the transmission ride on cam surfaces on the camshaft 44 and, when allowed by the position of the cams are urged downwardly by the springs 46. As illustrated in FIG. 3, pawl 46$b$ is in its lowered (engaged) position under the urging of spring 46$b$, and engages one of a plurality of pawl receiving notches in the periphery of ring gear 38$b$ thereby immobilizing said ring gear and providing a fixed reaction allowing the transmission of power through sun gear 34$b$ and planet gears 35$b$ to the planet gear carrier which, as mentioned previously serves as the output of the transmission.

The camshaft 44, pawls 45 and springs 46 are all carried within and supported by the housing 47 which is press fit in the opening 48 in the cover 49. Preferably a cover 50 is also provided to cover the cable 42, pulley 43, etc. and is attached to the cover 49 by any suitable means.

Preferably a detent type device is included in the shift mechanism to maintain shift in the desired position. Such a mechanism can be integral with the shift lever or at any other suitable place. In the preferred embodiment, a radial bore is provided through the camshaft 44 to accommodate a compression spring and two balls 52 which are urged outwardly thereby. Notches 53 are provided in the bore in the housing 47 and so located that the balls 52 engage said notches when the camshaft 44 is properly oriented in each of the positions, corresponding in number to the available gear ratios, allowing one of the pawls 45 to engage a ring gear 38.

The case 49 of the transmission 30 is affixed to the differential and braking assembly, designated generally by the numeral 60, by any suitable means such as bolts 61. The driving input to the differential and brake is from the carrier 36 of the transmission which is fixedly connected to the input sleeve 62. Preferably, and as shown, a bearing race in the form of cone 63 is provided and affixed to the sleeve 62 to, in conjunction with balls 64 and outer race 65 rotatably support the sleeve 62 within the housing 66.

Power transmitted through the input sleeve 62 is normally (i.e., when pedaling in the forward direction) transmitted to the differential, 70, and more particularly to the case 71 thereof via one-way clutch 72. Clutch 72 can be of any of the types well known in the art and is preferably of the roller type. The differential 70 is of generally conventional construction and provides differentiated driving of the output shafts 20 and 21 via the rotation of the case 71. Journal pin 72 engages the case 71 at either side thereof and is rotated thereby. With the two-piece case construction shown, bores 73 are drilled entirely through the case half 71$a$ and the pin 72 is secured therein against radial movement by the case half 71$b$ which is, of course, secured to case half 71$a$ by any suitable means, such as bolts 71$c$.

Pinion gears 74$a$ and b are rotatably mounted to the pin 72 in the conventional manner and drivingly engage side gears 75a and b which are fixedly secured to the shafts 20 and 21, respectively. The differential case 71 and more particularly the portion 71b thereof is rotatably mounted to and supported by the housing 66 via end plate 76 which snugly fits within said housing, bearings 77 and cone 78 which engages the rightward extension of the case portion 71b via the mating threads 79. Normally, a lock nut 79b is employed to secure the cone 78 against unintentional rotation on the threads 79. It will be observed that adjustment of both sets of bearings 64, 77 are effected by adjustment of the cone 78 only as a consequence of the foregoing construction. Specifically, tightening of the cone 78 pulls the case 71 to the right and with it, via nut 79c the sleeve 62 and thereby the cone 63 which reacts against the bearings 64. This construction also allows ready assembly of the present invention as will be obvious with reference to FIG. 3.

A braking means is also provided in the present invention, preferably reacting between the housing 66 and the differential case 71 upon reverse rotation of the input sleeve 62. With continued reference to FIG. 3, the preferred brake means is of the multiple interleafed disc type. One or more discs 80 are axially piloted on a plurality of splines on the exterior of the case 71. Interleafed therewith are discs 81 which are axially piloted on splines on the interior of the brake pressure pad 82. Annular walls are provided on the case 71 and pad 82 in face to face relationship and adapted to clamp the discs 80, 81 therebetween.

The pad 82 is urged to the right and into braking engagement against the discs 80, 81 by the lead nut 83 as it advances on the threads on the exterior of sleeve 62. Clutch teeth 84 are provided on the face to face mating portions of the brake pad 82 and lead nut 84 to prevent relative rotation of said pad and nut when they are engaged for braking. A drag spring 85 snugly engages the exterior of the lead nut 83 and pad and provides for engagement and disengagement thereof by inhibiting relative rotation therebetween. Normally the brake disengagement mechanism, designated generally as 90, will be in a position so as to render the brake pad 82 non-rotatable. Consequently, the vehicle is braked by such reverse rotation as a result of the pressure applied to the discs 80, 81 by the rightward urging of the lead nut 83 and thereby the brake pad 82. When forward pedaling of the vehicle is resumed, the rotation of the sleeve 62 is reversed and, as a result, the lead nut backs away from the previously established braking position and assumes the position shown in phantom thereby removing the pressure of the discs 80, 81.

As will be noted, the foregoing construction allows for driving wheel differentiation during braking as well as during driving of the vehicle. Further, should the vehicle roll backward, the brake is automatically engaged as a result of the reverse rotation of the axle shafts 20, 21, differential case 71 and thereby, through the one way clutch 72, of the input sleeve 62.

The brake disengagement mechanism 90 is an optional but highly desirable portion of the present invention. As hereinbefore described, the mechanism 90 normally allows braking by holding the brake pad 82 to prevent rotation thereof. Referring more particularly to FIG. 4, the brake pad 82 includes a plurality of raised axially extending ribs 91 defining notches 92 therebetween. A pawl 93 is carried and guided by bracket 94 which is mounted to the case 66. A spring 95 urges the pawl 93 inwardly and into engagement with the notches 92. Thus, the pawl 93 normally provides a reaction point for the brake pad 82.

Any suitable mechanism, not shown, can be provided to retract the pawl 93, against the urging of spring 95, out of engagement with the brake pad 82 thereby disabling the brake. Such disengagement is useful for two reasons. First, it allows the vehicle to be pushed backward without effecting the automatic brake engagement mentioned earlier. In addition, it provides a means for driving the vehicle in reverse. Referring again to FIG. 3 it will be seen that upon reverse driving of the input, and in the absence of engagement of the pawl 93 with the pad 82, a reverse driving connection is provided through the sleeve 62, lead nut 83, brake pad 82, brake discs 80, 81 and differential case 71.

An additional optional braking feature of the present invention is the differential case lock designated generally by the numeral 100. The lock 100 can be and preferably is generally similar to the brake disengagement mechanism 90 and, when engaged, locks the differential case 71 to the housing 66 and serves as a positive parking brake.

A plurality of notches 101 are provided in the case 71, sized and located to receive pawl 102 which is biased toward the case 71 by the spring 103. The pawl 102 is guided by an appropriately sized opening in the housing 66 and/or the bracket 104 which clamps about the pawl 102 and is secured to the housing 66 by any suitable means. Any suitable means, not shown, can be used to position the pawl 102 either against or out of engagement with the case 71. If desired, and as required by any particular application, the pawl 102 can be spring biased away from the case 71 and the control means suitably altered.

As will be apparent from the above, the present invention provides a compact versatile trans-axle with integral braking and with novel parking brake features. The description of the preferred embodiments is intended to be illustrative and not limiting and many variations within the spirit and scope of the following claim will occur to those skilled in the art.

The embodiments of the invention in which an exclusive property or privilege is claimed are defined as follows:

1. A trans-axle with integral braking assembly comprising in combination, a housing, a pair of aligned and independent output shafts mounted within said housing and having ends extending outwardly of said housing, differential means within said housing and operatively connected to said output shafts, planetary transmission means within said housing concentric with and carried on one of said output shafts and drivingly connected to said differential means for driving said output shafts, input means drivingly connected to said planetary transmission means, and braking means operatively connected between said differential means and said housing for braking said output shafts upon reverse movement of said input means.

2. An assembly according to claim 1, wherein said differential means includes differential case means mounted for rotation within said housing, a pinion shaft mounted within said differential case means, a pair of pinion gears rotatably mounted on said pinion shaft, and a pair of side gears mounted on respective ones of said output shafts and meshing with said pinion.

3. An assembly according to claim 1, wherein said planetary transmisson means comprises an input shaft, a plurality of sun gears on said input shaft, a ring gear associated with each sun gear, means for selectively locking any one of said ring gears, and a planet gear carrier drivingly associated with said differential and including planet gears drivingly engaging each of said sun gears.

4. An assembly according to claim 1 wherein said differential means includes an annular wall and said braking means includes at least one disc adjacent said wall and a brake pressure pad adjacent said disc and adapted to advance in the direction thereof upon reverse rotation of said input means.

5. An assembly according to claim 1 including a release means releasably securing said braking means to said housing, whereby said brake means can be released from said housing and thereby rendered inoperative.

6. An assembly according to claim 1 including a release means releasably securing said braking means to said housing, whereby said brake means can be released from said housing and thereby rendered inoperative.

7. An assembly according to claim 6, wherein said planetary transmission means comprises an input shaft, a plurality of sun gears on said input shaft, a ring gear associated with each sun gear, means for selectively locking any one of said ring gears, and a planet gear carrier drivingly associated with said differential and including planet gears drivingly engaging each of said sun gears.

8. A differential and braking assembly comprising, in combination: a housing; a pair of aligned and independent output shafts mounted within said housing and having ends extending outwardly of said housing; differential means operatively connected to said output shafts and defining a brake shoulder thereon; planetary transmission means within said housing concentric with and carried on one of said output shafts, said transmission means including an input drive member and an output drive member operatively connected to said differential means for driving said output shafts through said differential means; braking means including a brake surface spaced from said brake shoulder; a brake pack assembly positioned between said braking member and said brake shoulder; and wherein said output drive member comprises a sleeve having a lead screw defined on its exterior and a lead nut is mounted on said lead screw and driven thereby to engage said brake member upon reverse rotation.

* * * * *